United States Patent [19]
Takamura et al.

[11] Patent Number: 4,584,637
[45] Date of Patent: Apr. 22, 1986

[54] MULTIPLE STEP-UP RECTIFIER CIRCUIT

[75] Inventors: Yoshio Takamura, Yokohama; Akira Nakajima, Yokosuka, both of Japan

[73] Assignee: Tokyo Shibaura Denki Kabushiki Kaisha, Kawasaki, Japan

[21] Appl. No.: 535,161

[22] Filed: Sep. 23, 1983

[30] Foreign Application Priority Data

Sep. 28, 1982 [JP] Japan ............................ 57-168832
Sep. 28, 1982 [JP] Japan ............................ 57-168833
Nov. 30, 1982 [JP] Japan ............................ 57-209613

[51] Int. Cl.$^4$ ........................................ H02M 7/10
[52] U.S. Cl. ............................................... 363/61
[58] Field of Search ........................... 363/59, 60, 61

[56] References Cited

U.S. PATENT DOCUMENTS

| | | |
|---|---|---|
| 2,619,602 | 11/1952 | Walker et al. |
| 3,493,840 | 2/1970 | Rosenberg ............ 363/61 |
| 4,028,596 | 6/1977 | Weber .................... 363/60 |
| 4,084,218 | 4/1978 | Kenney ................. 363/60 |
| 4,437,147 | 3/1984 | Takamura et al. |

FOREIGN PATENT DOCUMENTS

| | | |
|---|---|---|
| 640675 | 7/1950 | United Kingdom . |
| 645630 | 11/1950 | United Kingdom . |
| 770605 | 3/1957 | United Kingdom . |
| 843736 | 8/1960 | United Kingdom . |
| 1214464 | 12/1970 | United Kingdom . |
| 1226580 | 3/1971 | United Kingdom . |
| 2100075 | 12/1982 | United Kingdom . |

OTHER PUBLICATIONS

Multi-Stage Voltage-Multiplying Circuits—pp. 158–168 (Ch. 17) by Graham J. Scoles, Ellis Howarth Limited, 1980.

Primary Examiner—Peter S. Wong
Assistant Examiner—Judson H. Jones
Attorney, Agent, or Firm—Cushman, Darby & Cushman

[57] ABSTRACT

A multiple step-up rectifier circuit comprises a transformer, a series circuit of diodes, a first series circuit of capacitors, a second series circuit of capacitors and a third series circuit of capacitors. An AC signal source is connected to the primary winding of the transformer. The secondary winding of the transformer has a tap connected to the ground. The tap is also connected to one end of the series circuit of diodes, so that the diodes are biased in the same direction. The first series circuit of capacitors is connected between both ends of the series circuit of diodes. The second series circuit of capacitors is connected between one end of the secondary winding and a connecting point between the diodes. The third series circuit of capacitors is connected between the other end of the secondary winding and another connecting point between the diodes. A connecting point between the capacitors is also connected to a connecting point between the diodes. Another connecting point between capacitors is connected to another connecting point between the diodes. A third connecting point between the capacitors is connected to yet another connecting point between the diodes.

2 Claims, 5 Drawing Figures

F I G. 1
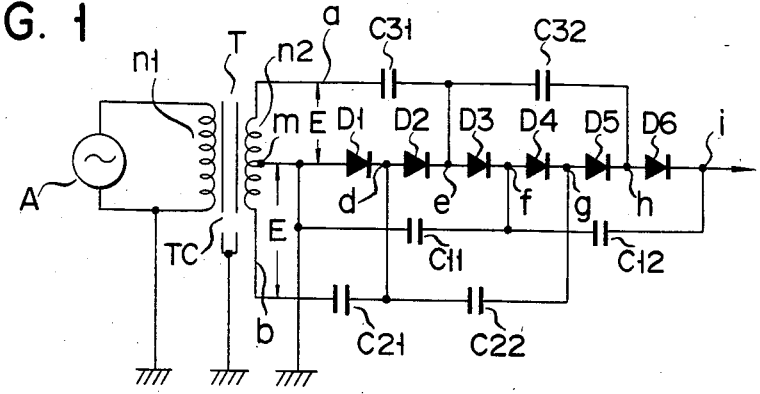
F I G. 2
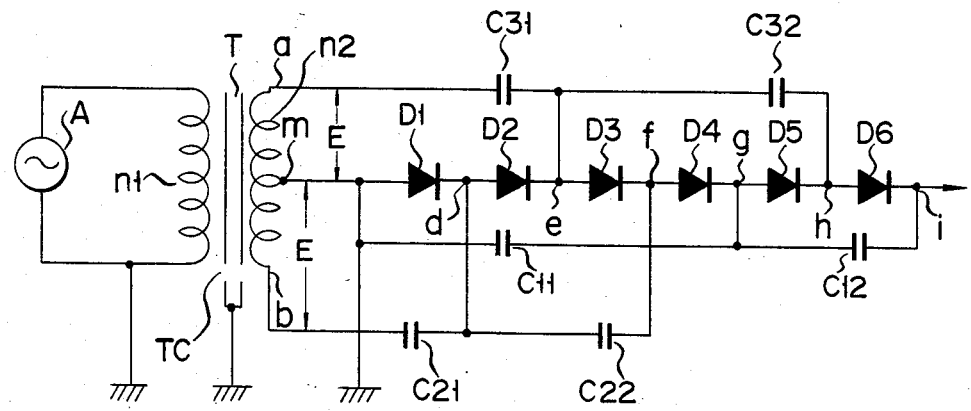
F I G. 3
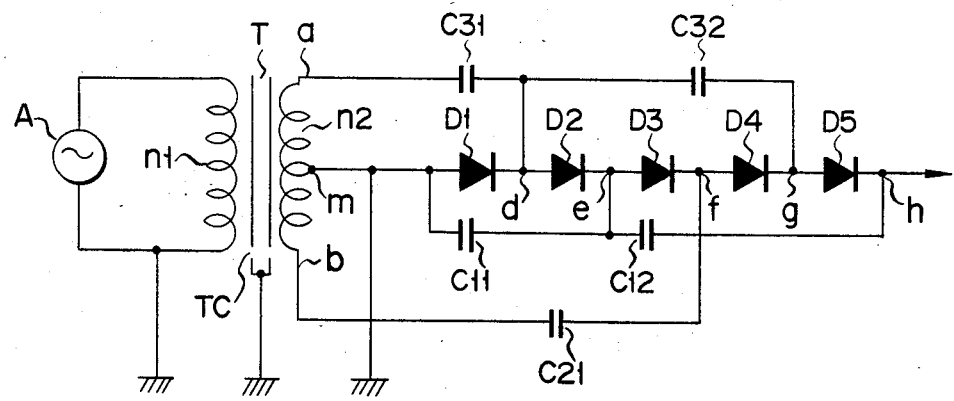

MULTIPLE STEP-UP RECTIFIER CIRCUIT

BACKGROUND OF THE INVENTION

The present invention relates to a multiple step-up rectifier circuit for rectifying an output voltage from the secondary winding of a transformer, and for boosting that voltage.

Various conventional multiple step-up rectifier circuits have been proposed. However, output voltages from these conventional circuits are relatively low. For this reason, the dielectric withstand voltage between primary and secondary windings of a transformer used in such a rectifier circuit may only be minimal.

Various compact power supply units with high-frequency arrangements have also been proposed, if only recently. A high-voltage power supply is not exceptional. The size of the high-voltage power supply tends to be decreased by the high-frequency arrangement. Even if a compact transformer is manufactured, the insulating gap between the primary and secondary windings of the transformer does not change, in principle. For this reason, linkage inductances of the primary and secondary windings are increased, depending on the size of the transformer. As a result, it is difficult to effectively induce a high voltage at the secondary winding. In particular, in a high-voltage transformer, corona discharge must be decreased to substantially zero, within the range of operating voltages, to achieve a long service life and high reliability. However, this is more difficult to achieve when an AC potential difference between the primary and secondary windings is increased.

SUMMARY OF THE INVENTION

A primary object of the present invention is to provide a multiple step-up rectifier circuit which has a simple circuit arrangement and a small number of circuit elements, and which allows for the generation of a high voltage using a transformer having a low dielectric withstand voltage between primary and secondary windings thereof.

To achieve the above object of the present invention, a multiple step-up rectifier circuit is provided, which comprises: a transformer having a primary winding connected to an AC signal source and a secondary winding with a tap; a plurality of rectifiers connected in series in such a way as to be biased in one direction; a plurality of first capacitors connected in series between both ends of the series circuit of the rectifiers, the connecting points between said first capacitors being connected to some of the connecting points between said rectifiers; at least one second capacitor connected between one end of the secondary winding of said transformer and one of the connecting points between said rectifiers; and a plurality of third capacitors connected in series between the other end of the secondary winding of said transformer and one of the connecting points between said rectifiers, the connecting points between said first capacitors, said second capacitor and said third capacitors being connected to the connecting points between the respective rectifiers.

BRIEF DESCRIPTION OF THE DRAWINGS

FIG. 1 is a circuit diagram of a multiple step-up rectifier circuit according to a first embodiment of the present invention;

FIG. 2 is a circuit diagram of a multiple step-up rectifier circuit according to a second embodiment of the present invention;

FIG. 3 is a circuit diagram of a multiple step-up rectifier circuit according to a third embodiment of the present invention;

DETAILED DESCRIPTION OF THE PREFERRED EMBODIMENTS

Figure 4:
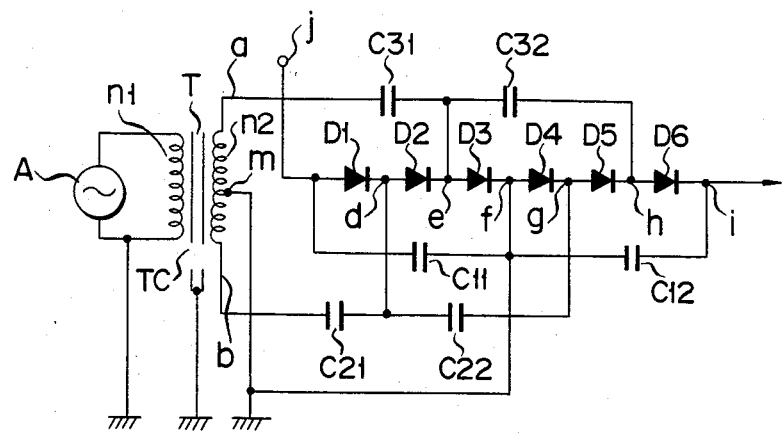
FIG. 4 is a circuit diagram of a multiple step-up rectifier circuit according to a fourth embodiment of the present invention.

An embodiment of the present invention may now be described with reference to the accompanying drawings.

With reference to FIG. 1, an AC power supply A is connected to the primary winding n1 of a transformer T. A rectangular AC voltage is applied from the AC power supply A to the primary winding n1. One end of the primary winding n1, a core TC of the transformer T, and a tap m (given as the central point) of a secondary winding n2 are respectively grounded. A series of diodes D1 to D6 are connected between the tap m and a connecting point i, in such a way that the diodes D1 to D6 have the same bias direction. More specifically, the anode of the diode D1 is connected to the tap m, and the cathode of the diode D6 is connected to the connecting point i. A series circuit of first capacitors C11, C12 is connected between the anode of the diode D1 and the cathode of the diode D6 (i.e., in parallel with the series circuit of diodes D1 to D6). The connecting point between the capacitors C11, C12 is connected to a connecting point f between the diodes D3, D4. Therefore, the capacitor C11 is connected in parallel to a series circuit of the diodes D1, D2, D3, and the capacitor C12 is connected in parallel to a series circuit of the diodes D4, D5, D6. A series circuit of second capacitors C21, C22 is connected in parallel between one output terminal b of the secondary winding n2 and a connecting point g between the diodes D4, D5. The connecting point between the second capacitors C21, C22 is connected to a connecting point d between diodes D1 and D2. Therefore, capacitor C21 is connected in parallel to diode D1, and capacitor C22 is connected in parallel to a series circuit of diodes D2, D3 and D4. A series circuit of third capacitors C31 and C32 is connected in parallel between the other output terminal a of the secondary winding n2 and a connecting point h between diodes D5 and D6. The connecting point between capacitors C31 and C32 is connected to a connecting point e between diodes D2 and D3. Finally, the capacitor C31 is connected in parallel to a series circuit of the diodes D1 and D2, and the capacitor C32 is connected in parallel with a series circuit of the diodes D3, D4 and D5.

The operation of the multiple step-up rectifier having the above arrangement may be described as follows. A rectangular AC voltage is applied to the primary winding n1 of the transformer T. Now assume that a voltage of 2E (V) appears across the output terminals a and b of the secondary winding n2 wherein the output terminal a is set to be positive. In this case, the capacitor C21 is supplied with a voltage of E (V) through the diode D1 with the point d positive and the output terminal b negative. Subsequently, the voltage across the output terminals a, b of the secondary winding n2 is inverted, and a voltage of 2E (V) appears, with output terminal b being positive and output terminal a being negative. In this case, capacitor C31 is charged through diode D2 with a voltage 3E (V) obtained as the sum of the voltage of 2E (V) between the output terminals of the secondary winding n2 and the voltage of E (V) charged in the capacitor C21. At this time, point e is set to be positive. When the voltage is inverted again, the capacitor C11 is charged through the diode D3, with a voltage of 4E (V) being obtained as the sum of the voltage of E (V) between the tap m and the output terminal a of the secondary winding n2, and the voltage of 3E (V) from the capacitor C31. At this time, point f is positive. At the same time, the capacitor C21 is charged again with the voltage of E (V) through the diode D1. In this case, the diode D1 is rendered conductive, so that the tap m is set at the same potential as that at point d. Therefore, the capacitor C22 is charged through the diodes D3 and D4 with a voltage of 4E (V) in the same manner as in the capacitor C11. At this time, the point g is set to be positive. Furthermore, when the output voltage from the secondary winding n2 is inverted, the capacitor C31 is charged with a voltage of 3E (V) through the diode D2 in the manner described above. Meanwhile, since the diode D2 is rendered conductive, point e is at the same potential as that of point d. Consequently, the capacitor C32 is charged through the diode D5 with a voltage equal to that at the capacitor C22 (i.e., a voltage of 4E (V)). At this time, point h is positive. When the output voltage from the secondary winding n2 is inverted, capacitor C21 is charged with a voltage of E (V) through diode D1, capacitor C11 is charged with a voltage of 4E (V) through diode D3, and capacitor C22 is charged with a voltage of 4E (V) through diodes D3 and D4. Meanwhile, since the diode D3 is rendered conductive, point e is at the same potential as that of point f. As a result, capacitor C12 is charged with a voltage of 4E (V) through diode D6. At this time, the point i is positive. In this manner, every time the voltage from the secondary winding n2 is inverted, the above operation is repeated. The combined voltages (8E (V)) from capacitors C11 and C12 appear at point i.

A multiple step-up rectifier circuit operated as described above has the following effects. No problem occurs in the primary winding n1 when the dielectric withstand voltage of the transformer T is considered, since the primary winding n1 receives a low voltage. An AC voltage of ±E (V) is generated from the secondary winding n2 with respect to the ground potential, so that a voltage of 2E (V) is generated across the output terminals a and b of the secondary winding n2. It is easy to structurally separate the output terminals a and b from each other. Furthermore, the separation of the output terminals a and b will not influence the electrical characteristics of the transformer T. As a result, no dielectric problem occurs between output terminals a and b. However, the distance between the primary and secondary windings n1, n2 influences magnetic coupling and the dielectric withstand voltage therebetween which, in turn, has a direct influence on the electrical characteristics of the transformer T. According to the present invention, the dielectric withstand voltage between the primary and secondary windings n1, n2 can be held low, in relation to the rectified output voltage, which is very advantageous.

AC corona discharge, which greatly influences the service life of the transformer, tends to occur when the distance between the primary and secondary windings is decreased to efficiently perform electromagnetic coupling, especially in a compact transformer obtained by high-frequency arrangement. From this viewpoint, the present invention is also advantageous in that the dielectric withstand voltage between the primary and secondary windings is decreased.

To obtain an output voltage of 20 (kv), a transformer having an AC dielectric withstand voltage of only 2.5 (kv) is required. If a conventional Cockcroft-Walton circuit is used, for a transformer having a given winding ratio, only four capacitors and four diodes, two-thirds the number of those in the circuit of the present invention, are required. However, the dielectric withstand voltage of the transformer is twice (5 (kV)) that of the transformer of the present invention. Therefore, if a transformer having a given dielectric withstand voltage is used, eight capacitors and eight diodes, or 4/3 the number of those in the circuit of the present invention, are required.

From the viewpoint of circuit performance, any circuit of the present invention has a smaller voltage drop when compared with a Cockcroft-Walton circuit having a transformer with the same dielectric withstand voltage as that of the transformer of the present invention under a given load current. When the step-up ratio of the multiple step-up is increased, this effect is also increased.

Under a given load current, the ripple component of the conventional Cockcroft-Walton circuit is increased in proportion to the square of a step-up ratio, while the ripple component of the circuit of the present invention is increased in proportion to a step-up ratio or a value less than this ratio. Therefore, the circuit of the present invention can be designed to have a small ripple component when compared with that of the conventional Cockcroft-Walton circuit.

According to the present invention, the dielectric withstand voltage of the capacitor is only slightly increased, compared to that of the conventional circuit. However, the shape of the internal elements of the capacitor is considerably simpler. Capacitors having a high dielectric withstand voltage are commercially available, which is not the case with transformers.

As may be seen from the above embodiment, the number of capacitors or diodes is not limited to six, but may be extended in multiples of 3, to increase the step-up ratio. This can be achieved by repeating the operation described above.

FIG. 2 shows a multiple step-up rectifying circuit according to a second embodiment of the present invention.

The connecting point between capacitors C11 and C12 (FIG. 1) is connected in the second embodiment to the connecting point g between diodes D4 and D5. Other arrangements of the second embodiment are substantially the same as those of the first embodiment.

The operation of the circuit having the above arrangement may be described as follows.

A rectangular AC voltage is applied to a primary winding n1 of a transformer T. Now assume that a voltage of 2E (V) appears across output terminals a and b of a secondary winding n2 such that the output terminal a is set to be positive. In this case, the capacitor C21 is supplied with a voltage of E (V) and the connecting point d is positive.

Let us now assume that a voltage of 2E (V) occurs between the output terminals a, b of the secondary winding n2, in such a way that the output terminal b is set to be positive. In this case, the capacitor C31 is supplied, through diode D2, with a voltage of 3E (V), as a sum of the voltage of 2E (V) from the output terminals a, b of the secondary winding n2 and the voltage of E (V) charged in the capacitor C21. At this time, connecting point e is positive.

When the voltage across the output terminals a, b of the secondary winding n2 is re-inverted, the capacitor C21 is charged through diode D1. In this case, since the diode D1 is rendered conductive, the connecting point d has the same potential as that of the tap m of the secondary winding n2. The capacitor C22 is supplied through the diode D3 with a voltage of 4E (V) as a sum of the voltage of E (V) across the tap m and the output terminal a of the secondary winding n2 and the voltage of 3E (V) charged on the capacitor C31. At this time, the connecting point f is positive.

When the voltage across the output terminals a, b of the secondary winding n2 is inverted, capacitor C31 is supplied with a voltage of 3E (V), through diode D2. In this condition, since the diode D2 is rendered conductive, point d has the same potential as that of point e. Therefore, the capacitor C32 is supplied through the diodes D4 and D5 with a voltage of 4E (V) from the capacitor C22.

Simultaneously, capacitor C11 is supplied, through diode D4, with a voltage of 6E (V), as the sum of the voltage of E (V), which is located between the tap m and the output terminal b of the secondary winding n2; the voltage of E (V) from the capacitor C21; and the voltage of 4E (V) from the capacitor C22.

When the voltage across the output terminals a, b of the secondary winding n2 is inverted, capacitors C21 and C22 are supplied with voltages E (V) and 4E (V), through the diodes D1 and D3, respectively. At the same time, with reference to the tap m of the secondary winding n2, the connecting point h is set at a voltage of 8E (V) which is the sum of voltage E (V) located between the tap m and point a of the secondary winding of the transformer, voltage 3E (V) from the capacitor C31, and voltage 4E (V) from the capacitor C32. The capacitor C12 is supplied through the diode D6 with a voltage having a difference 2E (V) from the voltage of 6E (V) of the capacitor C11.

Every time the voltage across the output terminals a, b of the secondary winding n2 is inverted, the above operation is repeated. As a result, a steady voltage of 8E (V) appears at point i, and a steady voltage of 6E (V) appears at point g. The points i and g, respectively, can be used as high voltage output terminals.

The same effect obtained in the first embodiment may be obtained by the second embodiment.

FIG. 3 shows the basic arrangement of a multiple step-up rectifier circuit according to a third embodiment of the present invention.

Referring to FIG. 3, capacitor C11 is connected in parallel to a series circuit of diodes D1 and D2. Capacitor C12 is connected in parallel to a series circuit of diodes D3, D4 and D5. One end of capacitor C21 is connected to an output terminal b of a secondary winding n2, and the other end thereof is connected to a connecting point f between diodes D3 and D4. One end of capacitor C31 is connected to an output terminal a of the secondary winding n2, and the other end thereof is connected to a connecting point d between diodes D1 and D2. Capacitor C32 is connected in parallel to a series circuit of diodes D2, D3 and D4.

The circuit of this embodiment can generate a high voltage output in substantially the same manner as those of the first and second embodiments, with the same effect.

One circuit arrangement of the conventional multiple step-up rectifier circuit was presented in the first to third embodiments. However, according to the present invention, the number of diodes and capacitors can be considerably changed in accordance with the dielectric withstand voltage of the capacitor and the number of outputs. Therefore, the number of circuit elements can be reduced to a minimum, thereby providing a highly reliable, low-cost circuit.

FIG. 4 shows a multiple step-up rectifier circuit according to a fourth embodiment of the present invention.

Two ends i, j of six series-connected diodes D1 to D6 are positive and negative high-voltage output terminals, respectively.

Referring to FIG. 4, the circuit shown therein is substantially the same as that of FIG. 1, except that an anode of a diode D1 is disconnected from a tap m of a secondary winding n2 and is connected to a connecting point j, and a connecting point f between diodes D3 and D4 is grounded.

The operation of the circuit described above may be described as follows.

Let us assume that a voltage of 2E (V) occurs across the output terminals a, b of the secondary winding n2, with output terminal a set to be positive. A capacitor C31 is supplied with a voltage E (V) from the following closed loop consisting of the output terminal a, capacitor C31, connecting point e, diode D3, connecting point f and tap m. At this time, the output terminal a is set to be positive.

When the voltage between the output terminals a, b of the secondary winding n2 is inverted, a voltage of 2E (V) occurs across the terminals a, b and output terminal b is set to be positive. In this case, capacitor C21 is charged with a voltage of 3E (V), i.e., the sum of the voltage E (V) from the capacitor C31 and the voltage 2E (V) at the secondary winding n2. At this time, voltage 3E (V) is supplied to the capacitor C21, through components which occur in the following order: connecting point d, diode D2, connecting point e, capacitor C31, output terminal a and output terminal b. The output terminal b is then set to be positive.

The output voltage at the secondary winding n2 is re-inverted, so that a voltage 2E (V) appears across the output terminals a, b, in such a way that output terminal a is positive. The capacitor C11 is charged with a voltage of 4E (V) from the closed loop consisting of the connecting point j, diode D1, connecting point d, capacitor C21, output terminal b, tap m and connecting point f. This voltage 4E (V) is the sum of the voltage 3E (V) charged on the capacitor C21 and the voltage E (V) appearing between the output terminal b and the tap m of the secondary winding n2. At this time, the connecting point f is set to be positive. Simultaneously, the capacitor C22 is charged with a voltage of 4E (V) from the closed loop consisting of the connecting point d, capacitor C21, the connecting point b, tap m, connecting point f, diode D4 and connecting point g. Meanwhile, the capacitor C31 is supplied with a voltage of E (V) through the closed loop.

The output voltage from the secondary winding n2 is then inverted, and a voltage of 2E (V) is generated in such a way that output terminal b is positive. In this case, capacitor C32 is charged with a voltage of 4E (V), from the closed loop consisting of connecting point e, capacitor C31, output terminal a, output terminal b, capacitor C21, capacitor C22, connecting point g, diode D5 and connecting point h. The connecting point h is then set to be positive. The voltage charged on capacitor C32 is obtained by adding a voltage E (V) to capacitor C31, the output voltage 2E (V) of the secondary winding n2 and the voltage 4E (V) of capacitor C22, to produce a sum of 7E (V); and, then, by subtracting the voltage 3E (V) on capacitor C21 from that sum. Meanwhile, the capacitor C21 is recharged to a voltage of 3E (V), through the above-mentioned closed loop.

The output voltage from the secondary winding n2 is again inverted, so that a voltage of 2E (V) appears across the output terminals a, b, in such a way that output terminal b is set to be positive. The capacitor C12 is charged through the closed loop consisting of the connecting point f, tap m, the output terminal a, capacitor C31, connecting point e, capacitor C32, connecting point h, diode D6 and connecting point i. In this case, a voltage of 4E (V), obtained by adding the voltage of E (V), appearing across the tap m and output terminal a, and the voltage of 4E (V) from the capacitor C32; and, then, by subtracting the voltage of E (V) from capacitor C31 from the obtained sum, is supplied to capacitor C12 in such a manner that the connecting point i is set to be positive. Meanwhile, the capacitor C31 is charged again with a voltage of E (V). Thereafter, every time the output voltage from the secondary winding n2 of the transformer T is inverted, the operation described above is repeated, until a voltage of 4E (V) is supplied to capacitor C11 in such a way that connecting point f is set to be positive, and a voltage of 4E (V) is applied to capacitor C12 in such a way that connecting point i is positive. As a result, a voltage +4E (V) occurs at the connecting point i, and a voltage −4E (V) occurs at the connecting point j.

The multiple step-up rectifier circuit having the configuration described above can obtain the same effects as those of the first to third embodiments.

Furthermore, according to the fourth embodiment, a plurality of positive and negative outputs can be arbitrarily generated by using a single transformer. Therefore, a high-voltage power supply for a TWT (traveling wave tube) using a plurality of positive and negative voltages can be readily arranged by using the circuit of the fourth embodiment. This embodiment can also be effectively used for an X-ray power supply which generates a high voltage between the output terminals, with minimum ground insulation. For example, according to this embodiment, a dielectric ground voltage of 40 (kV) is required to obtain a voltage of 80 (kV) between the output terminals when a transformer having a dielectric withstand voltage of 10 (kV) is used.

Figure 5:
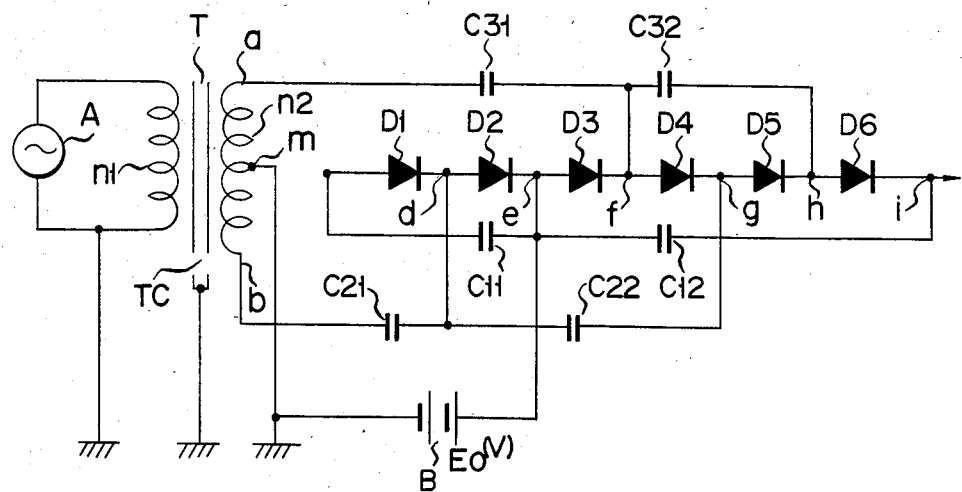
FIG. 5 is a circuit diagram of a multiple step-up rectifier circuit according to a fifth embodiment of the present invention.

FIG. 5 shows a fifth embodiment of the present invention, which is a modification of the circuit shown in FIG. 4.

With reference to FIG. 5, a connecting point between capacitors C31 and C32 is connected to a connecting point f between diodes D3 and D4. A connecting point between capacitors C11 and C12 is connected to a connecting point e between diodes D2 and D3 and to a tap m of a secondary winding n2 through a power supply B having a voltage $E_0$ (V). Other parts of the circuit shown in FIG. 5 are the same as those shown in FIG. 4.

According to the circuit described above, capacitor C31 is immediately supplied with a voltage of $E_0$ (V), through diode D3. The capacitor C21 is supplied with a voltage $E_0$ (V) so that point d is set at a positive potential by the leak current from the diode D2 (this can be completed in 1 or 2 seconds when the capacitance of the capacitor C21 is 0.01 ($\mu$F), and the resistance of the diode D6 is 100 (M$\Omega$)).

The operation of the fifth embodiment shown in FIG. 5 may be described as follows. Let us assume that a voltage 2E (V) is generated across the secondary winding n2, whereby output terminal b is positive. In this case, a voltage of E (V) is applied from output terminal b to the tap m, through capacitor C21, connecting point d, diode D2, connecting point e and power supply B. As a result, capacitor C21 is supplied with a voltage of $E_0-E$ (V), whereby connecting point d is set to be positive. A voltage E (V) is applied from output terminal a to capacitor C31, through tap m, power supply B, connecting point e, diode D3 and connecting point f. Since the power supply B applies a voltage of $E_0$ (V), the capacitor C31 is supplied with a voltage of $E_0+E$ (V), whereby the connecting point f is set to be positive.

Let us assume that a voltage of 2E (V) is generated across the secondary winding n2 and is then inverted, whereby output terminal a becomes positive. In this case, a voltage of 2E (V) is applied to the capacitor C11 through the closed loop consisting of the connecting point d, capacitor C21 [$-(E_0-E)$ (V)], connecting point b, tap m, power supply B, capacitor C11 [$-2E$ (V)] and connecting point j, diode D1. Hence, the connecting point j is set to be positive.

Meanwhile, a voltage of 4E (V) is applied to capacitor C22 through the closed loop consisting of connecting point d, capacitor C21 [$-(E_0-E)$ (V)], output terminal b, output terminal a, capacitor C31 [$E_0+E$ (V)], connecting point f, diode D4, connecting point g and capacitor C22. As a result, connecting point g is set to be positive.

Suppose a voltage of 2E (V) is further generated and is so applied across the secondary winding n2 that output terminal b is positive. Then, a voltage of 4E (V) is applied to the capacitor, through the closed loop consisting of capacitor C31 [$-(E_0+E)$ (V)], output terminal a, output terminal b, capacitor C21 [$E_0-E$ (V)], capacitor C22 [4E (V)], connecting point g, diode D5, connecting point h and capacitor C32. In this case, connecting point h is set to be positive.

Let us assume that the output voltage from the secondary winding n2 is so inverted that output terminal a becomes positive. In this case, a voltage of 6E (V) is supplied to the capacitor C12 through the closed loop consisting of the power supply B, tap m, output terminal a, capacitor C31, capacitor C32 [4E (V)], connecting point h, diode D6 and capacitor C12. The connecting point i is set to be positive. Consequently, the voltage between the connecting points j and i rises to 8E (V). And the potential difference between the ground and the connecting point j is $E_0-2E$ (V), and the potential difference between the ground and the connecting point i is $E_0+6E$ (V).

The circuit of the fifth embodiment can perform the same function as those of the first to fourth embodiments.

Furthermore, in a manner similar to that in the second and fifth embodiments, the circuit can be effectively arranged, so that capacitor C11 or C12 may be connected in parallel to a series circuit of at least four diodes, to decrease the number of elements, and capacitor C11 or C12 may be connected in parallel to a series circuit of two diodes, to provide an output voltage margin.

In the first to fifth embodiments, the diodes appear in one biasing direction. However, the biasing direction may be reversed. In this case, the polarity of charge for each capacitor is inverted, and the output voltage and the operations described in the above embodiments can be performed.

In the above embodiments, the tap m of the transformer T is the central point of the secondary winding. However, the tap m need not be the central point, but may be preset to be an arbitrary point. In this case, the dielectric withstand voltage required for the transformer is slightly increased.

According to the present invention, as described in detail above, a multiple step-up rectifier circuit having a simple circuit arrangement and a small number of elements can be provided, wherein a high voltage can be generated by a transformer having a low dielectric withstand voltage between the primary and secondary windings.

What is claimed is:

1. A multiple step-up rectifier circuit comprising:

two output terminals;

transformer means having a primary winding connected to an AC signal source, and a secondary winding with a tap;

a plurality of rectifying means connected in series, thus forming a series circuit, and being biased in one direction, the ends of said series circuit being connected to said two output terminals, respectively, said two output terminals being isolated from said center tap;

a plurality of first capacitive means connected in series between the ends of said series circuit of said rectifying means, the connecting points between said first capacitive means being connected to first connecting points between said rectifying means, which are other than those adjacent to the ends of said series circuit of said rectifying means and are not adjacent to one another;

at least one second capacitive means connected between one end of the secondary winding of said transformer means and a second connecting point between said rectifying means; and a plurality of third capacitive means connected in series between the other end of the secondary winding of said transformer means and a third connecting point between said rectifying means, the connecting points between said third capacitive means being connected to fourth connecting points, which are not adjacent to one another, and to connecting points other than those adjacent to the third connecting point and said tap being coupled to one of the connecting points of said first capacitive means.

2. A circuit according to claim 1, wherein a DC power supply is connected between said tap and said one connecting point of said first capacitive means.

* * * * *